United States Patent [19]

Launay

[11] 4,224,895
[45] Sep. 30, 1980

[54] APPARATUS FOR COATING FROZEN PORTIONS WITH A GRANULATED PRODUCT

[75] Inventor: Noël Launay, Beauvais, France

[73] Assignee: Societe d'Assistance Technique pour Produits Nestle S.A., Lausanne, Switzerland

[21] Appl. No.: 16,067

[22] Filed: Feb. 28, 1979

[30] Foreign Application Priority Data

Mar. 10, 1978 [FR] France .................. 78 07068

[51] Int. Cl.² ................ B05C 13/02; B05C 19/00
[52] U.S. Cl. ............................. 118/16; 118/18; 118/20; 118/25; 118/502
[58] Field of Search ............. 118/28, 18, 20, 24, 118/16, 25, 502, 406, 304; 426/289, 292

[56] References Cited

U.S. PATENT DOCUMENTS

| | | | |
|---|---|---|---|
| 2,339,437 | 1/1944 | Taylor | 118/16 |
| 2,695,590 | 11/1954 | Zuercher | 118/502 X |
| 3,547,075 | 12/1970 | Johnson | 118/16 |

Primary Examiner—John P. McIntosh
Attorney, Agent, or Firm—Watson, Leavenworth, Kelton & Taggart

[57] ABSTRACT

Apparatus and process for coating frozen portions of a foodstuff with a granulated product with a conveyor carrying plates for supporting the portions and adapted to advance stepwise and sequentially to:
  depositing the granulated product on the plates,
  positioning the portions on the plates,
  supplying heat to the surfaces of the portions,
  coating the portions with granulated product and
  discharging the coated portions from the conveyor.

7 Claims, 4 Drawing Figures

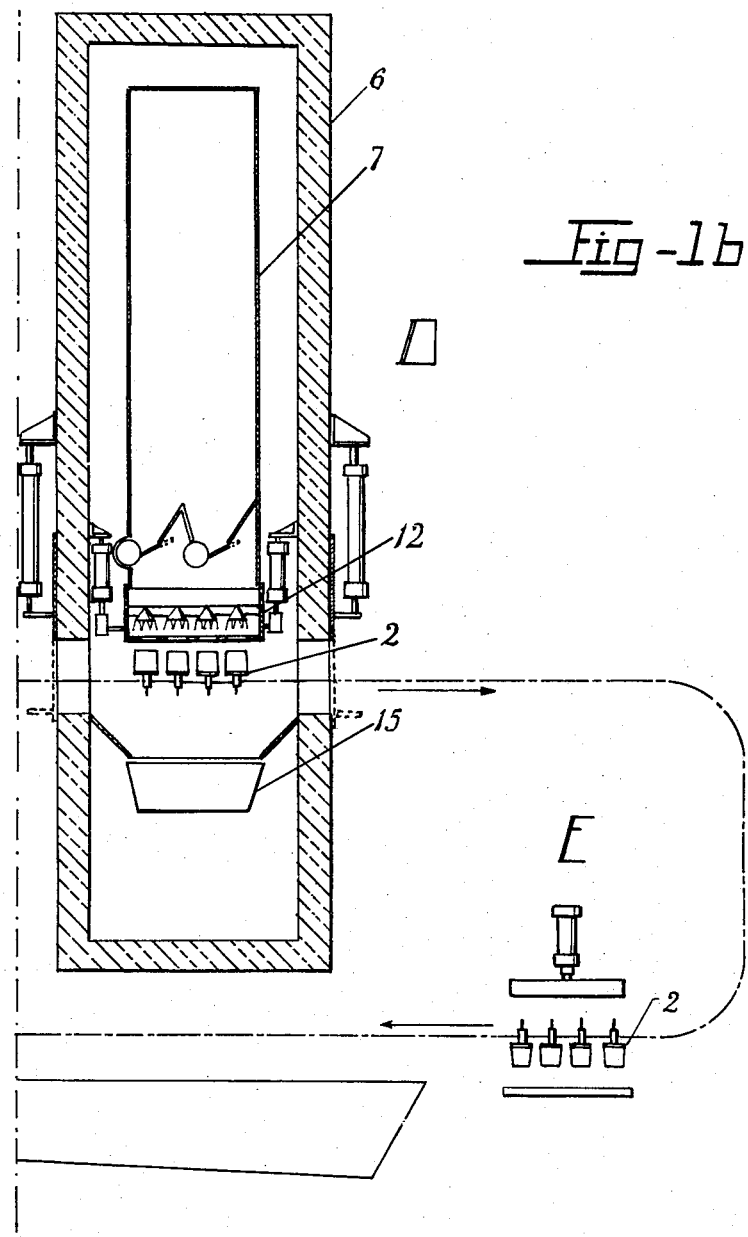

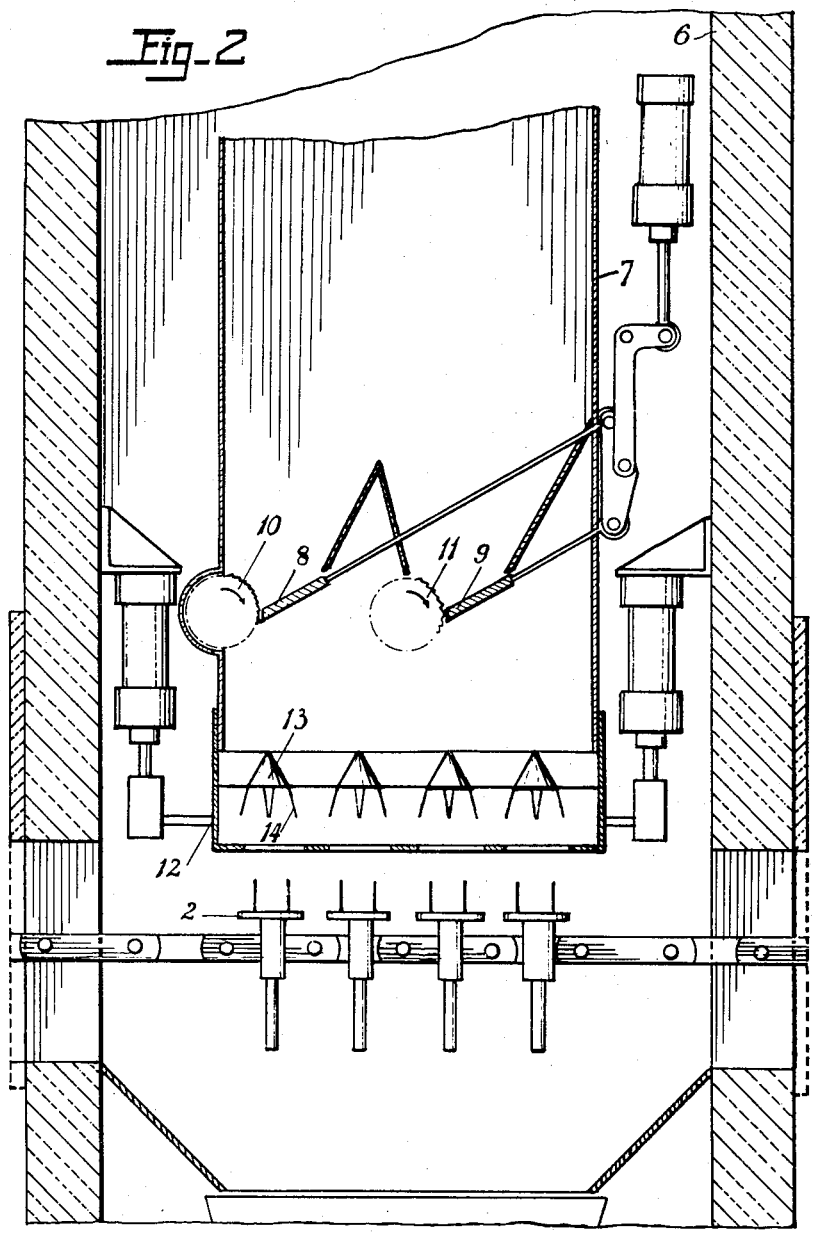

APPARATUS FOR COATING FROZEN PORTIONS WITH A GRANULATED PRODUCT

This invention relates to an apparatus for coating frozen portions with a granulated product.

The apparatus suitable for coating frozen portions of a foodstuff with a granulated product comprises a conveyor carrying plates for supporting the portions and adapted to advance stepwise and sequentially to: a unit for depositing the granulated product on the plates, a unit for positioning the portions on the plates, a unit for supplying heat to the surfaces of the portions, a unit for coating the portions with granulated product and a unit for discharging the coated portions from the conveyor.

The operation of the apparatus for coating frozen portions of a foodstuff with a granulated product comprises successively: depositing the granulated product on plates for supporting the portions, positioning the portions on the plates, softening the surfaces of the portions by applying heat, applying granulated product to the surfaces of the portions by introducing the portions into a container of granulated product.

One embodiment of the invention is illustrated by way of example in the accompanying drawings.

FIGS. 1a and 1b show the two halves of a diagrammatic longitudinal section through the apparatus as a whole.

FIG. 2 is a more detailed longitudinal section through the coating unit.

Figure 1A:
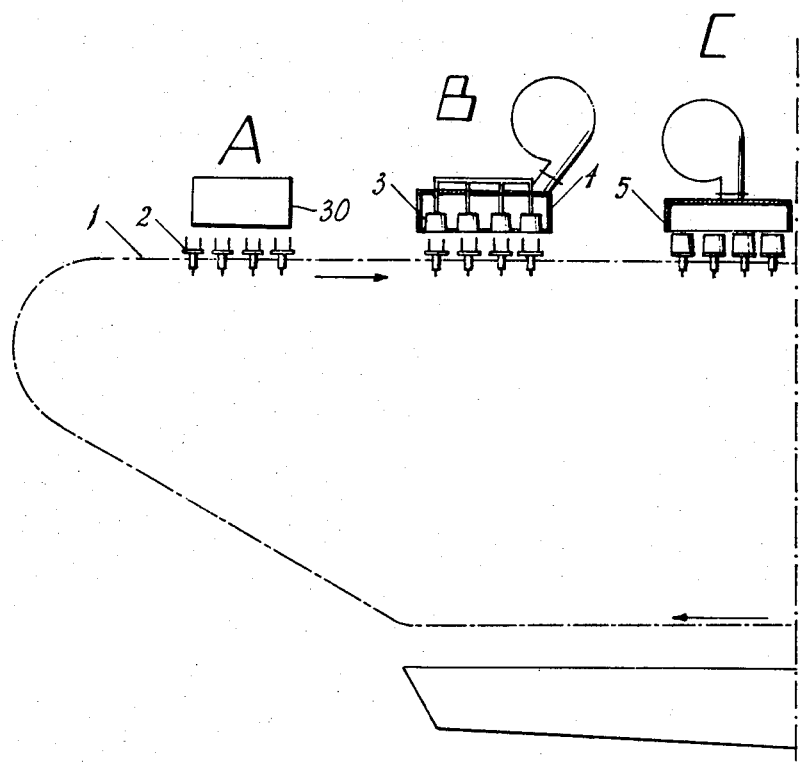

Referring to the drawings, the apparatus comprises a conveyor 1 adapted to advance in steps to which plates 2 supporting the frozen portions are fixed and of which the construction will be described in detail hereinafter.

The reference A denotes a unit for depositing the granular product onto the plates by conventional means 30.

The reference B denotes a unit for positioning the frozen portions on the plates 2.

The frozen portions are held in the cavities of a mould 3 which open downwards opposite the plates 2. A small opening is provided in the base of each cavity. The unit B comprises a heated chamber 4 surrounding the mould 3 and compressed air supply lines are connected to openings in the bases of the cells.

The unit C for superficially heating the frozen portions comprises a housing 5 open at its lower end which is positioned above the plates 2 and fed with air at between 20° C. and 600° C.

The coating unit D is housed in a heat-insulated enclosure 6 inside which circulates a stream of cold air having a temperature of from −8° C. to −40° C. and preferably around −20° C. Gates enable this enclosure to be shut when the conveyor 1 is stationary.

The unit D comprises a hopper 7 containing the granulated product. The base of this hopper (see FIG. 2) is inclined and provided with slidable traps 8 and 9 and rotatable grooved rollers 10 and 11.

The lower end of the hopper 7 is formed by a vertically displaceable box 12. The lower surface of this box has openings equal in number and shape to the plates 2 situated below.

The displaceable box 12 also comprises a series of elements equal in number to the plates 2 situated below. Each of these elements is formed by a cone 13, of which the base is slightly smaller in diameter than a plate 2, and blades 14 which give these elements the general appearance of a flower with its petals.

An elevator (not shown) is arranged inside the insulated enclosure 6 behind the hopper 7 in relation to the sectional plane of the Figures. This elevator is fed by a vibrating tray 15 situated below the hopper 7 and carries its load to the top of the hopper 7.

Figure 3:
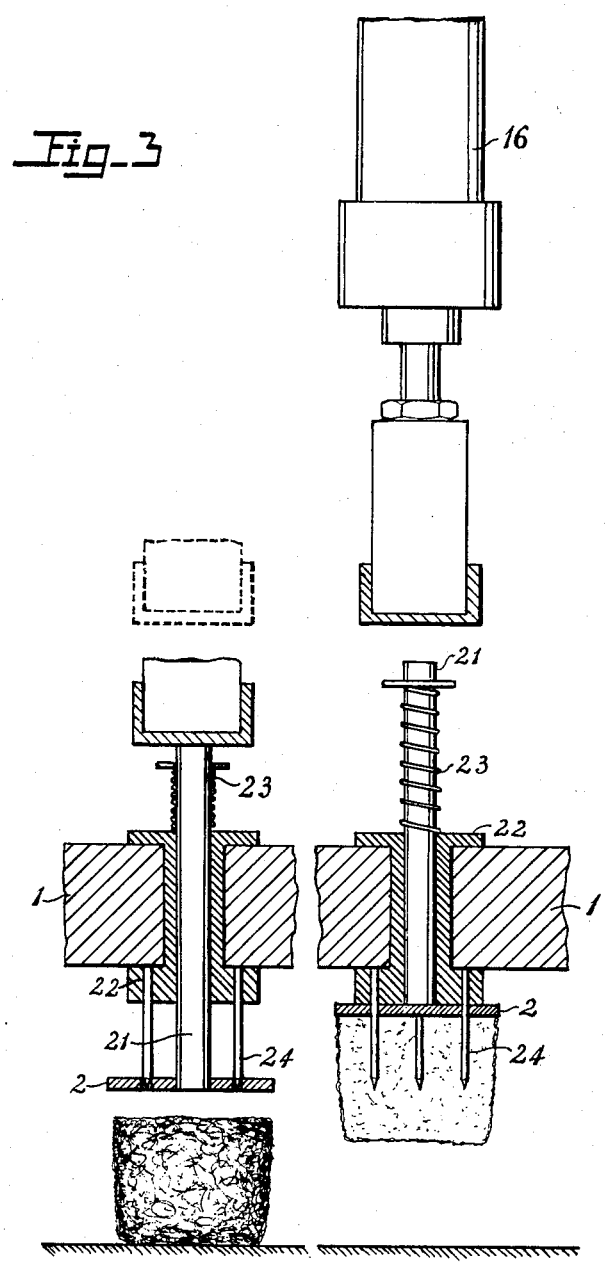
FIG. 3 is a detailed section through the discharging unit.

The discharging unit E and more particularly the plates 2 are shown in more detail in FIG. 3. Each plate 2 is carried by a rod 21 slidable in a sleeve 22 fixed to the conveyor 1. A return spring 23 urges the plate 2 towards sleeve 22. Each sleeve 22 carries spikes 24 extending through openings in the plate 2. A ram 16 acts on the end of the rod 21. A receiving plate is placed below the unit.

In the example illustrated, a unit for washing the conveyor and the plates is situated substantially below the enclosure 6, being followed in the direction of travel of the conveyor by a draining and drying unit. Both these units are conventional.

The apparatus operates as follows:

The conveyor 1 advances in steps, i.e. it advances and then stops to enable the operations carried out at the various units to be completed, advancing again on completion of these operations. Referring to the Figures, the upper flight of the conveyor moves from left to right and its lower flight from right to left. The operations taking place at the various units are as follows:

At the unit A, granulated product is discharged onto the plates 2 to cover them with a layer of this product.

At the unit B, each mould 3, which contains the frozen portions upside down, is heated in the enclosure 4 which releases the portions from the mould walls. Compressed air introduced through the openings in the bases of the cavities expels the portions. The portions are then placed on the plates 2 where they are held by the spikes 24 (FIG. 3).

At the unit C, the frozen portions are exposed to a stream of hot air and slightly softened at their surface.

At the unit D, the gates of the enclosure 6 are closed and the box 12 descends into its lower position in which its openings surround the plates 2. The traps 8, 9 are then opened and the grooved rollers 10, 11 rotated. The granulated product is then uniformly distributed over the portions which are capped by the elements 13, 14 until the box 12 is full.

The box 12 and the elements 13, 14 are then vertically reciprocated a few times over a distance of a few millimeters which tamps the granulated product onto the frozen portions. Finally, the box 12 is raised into the position shown in the drawing. The granulated product which does not adhere to the frozen portions falls to the bottom of the enclosure 6 where it is taken up by the tray 15 and the elevator and carried upwards into the hopper 7. The gates of the enclosure 6 are opened and the conveyor advances.

At the unit E, the plates 2 are inverted and receiving trays are positioned below the coated products. The ram 16 actuates the rods 21 which releases the coated portions from the spikes 24 and deposits them on a receiving tray (left-hand side of FIG. 3).

The plates, the spikes and the conveyor are then washed, drained and dried and the cycle recommences.

The described apparatus is particularly suitable for coating portions of ice cream with praline, i.e. a mixture of crushed nuts and almonds roasted with caramelised sugar.

I claim:

1. Apparatus suitable for coating frozen portions of a foodstuff with a granulated product, said apparatus comprising a conveyor, plates carried on said conveyor, said conveyor being operable to advance said plates stepwise and sequentially to a number of stations along a fixed conveyor travel course, means disposed at a first of said stations for depositing granulated product on the plates, means disposed at a second one of said stations for depositing and positioning frozen foodstuff portions on top of the granulated product on the plates, means disposed at a third one of said stations for heating the surfaces of the frozen foodstuff portion to soften same, means disposed at a fourth one of said stations for coating the softened surfaces of the frozen foodstuff portions with granulated product and means disposed at a fifth one of said stations for discharging the coated portion from the conveyor.

2. An apparatus as claimed in claim 1, wherein the coating means disposed at the fourth station is housed in a low-temperature enclosure.

3. An apparatus as claimed in claim 1 wherein the coating means disposed at the fourth station comprises a hopper for holding granulated product, and a box displaceable vertically carried at the lower part of the hopper.

4. An apparatus as claimed in claim 3, wherein the box comprises coating members formed by a core and blades having the general appearance of a flower with its petals.

5. An apparatus as claimed in claim 3, wherein the box is provided at its lower end with openings adapted to receive the plates.

6. An apparatus as claimed in claim 1, wherein the coating means disposed at the fourth station comprises a hopper for holding granulated product, the hopper being provided with inclined walls at the lower part thereof defining granulated product pass through openings in the hopper, a rotatable grooved roller associated with and disposed in each pass through opening, and a sliding trap associated with each pass through opening and cooperative with an associated grooved roller to close off the respective opening.

7. An apparatus as claimed in claim 1, wherein each plate is carried by a rod adapted to slide in a sleeve fixed to the conveyor, the sleeve carrying spikes extending through openings formed in the plate.

* * * * *